United States Patent [19]
Christina

[11] 3,762,738
[45] Oct. 2, 1973

[54] CONTAINER CARRYING CARTS
[76] Inventor: Paul J. Christina, 9330 Chicago Ave., Bloomington, Minn. 55420
[22] Filed: Nov. 15, 1971
[21] Appl. No.: 198,724

[52] U.S. Cl....... 280/47.19, 248/DIG. 7, 280/47.33, 287/14, 287/99
[51] Int. Cl............................................. B62b 1/10
[58] Field of Search..................... 280/47.16, 47.19, 280/47.24, 47.26, 47.33, 150.5, 301, 302; 211/71; 248/289, 291, DIG. 7; 287/14, 99

[56] References Cited
UNITED STATES PATENTS

| 1,885,384 | 11/1932 | Snow | 287/14 |
| 3,341,219 | 9/1967 | Marini et al. | 280/47.19 |
| 934,949 | 9/1909 | Trickey et al. | 280/47.16 X |
| 3,235,213 | 2/1966 | Hall | 248/DIG. 7 |
| 3,463,502 | 8/1969 | Gough | 280/47.19 X |
| 2,930,629 | 3/1960 | Schnell | 280/150.5 |
| 3,529,850 | 9/1970 | Montalto | 280/150.5 |

FOREIGN PATENTS OR APPLICATIONS

| 4,968 | 11/1913 | Great Britain | 280/47.24 |
| 76,392 | 3/1950 | Norway | 280/47.26 |

Primary Examiner—Kenneth H. Betts
Assistant Examiner—Leslie J. Paperner
Attorney—Richard P. Ulrich

[57] ABSTRACT

A container carrying cart, having handles at either end, a single pair of wheels attached at either end of a transverse axle located at the balance point of the cart, and a pair of "kick-stands" located at either end of the cart for supporting the cart when at rest. Each "kick-stand" having a set position and a retracted position, the stand moving from the set to the retracted position in response to a slight forward motion of the cart accompanied by a slight downward pressure on a handle.

11 Claims, 8 Drawing Figures

PATENTED OCT 2 1973     3,762,738
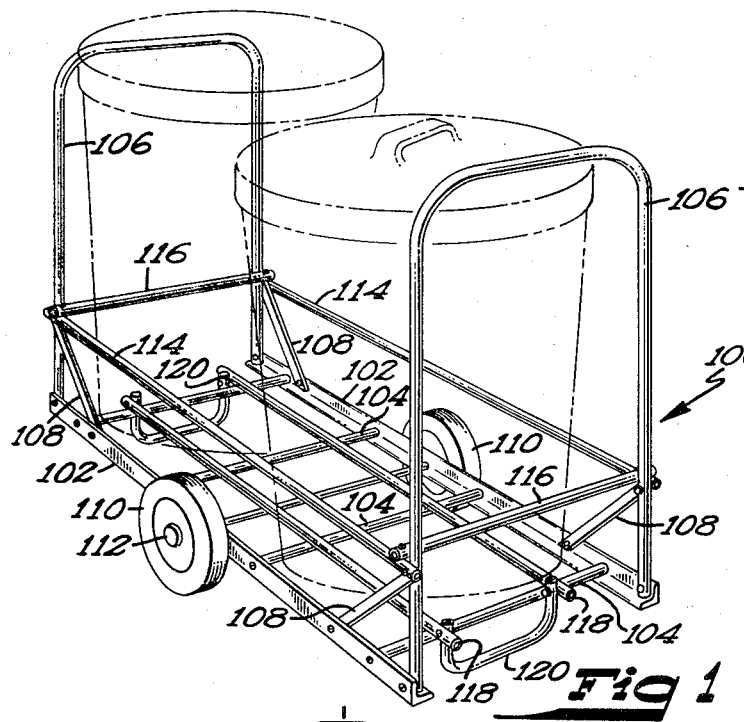
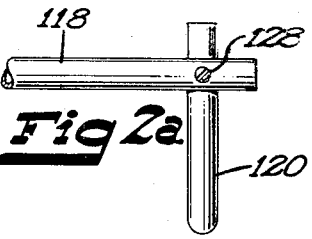
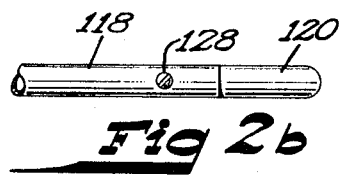
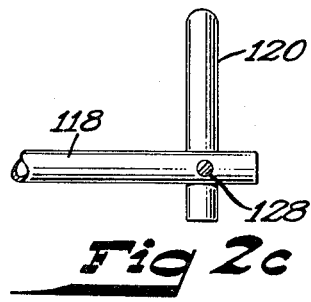
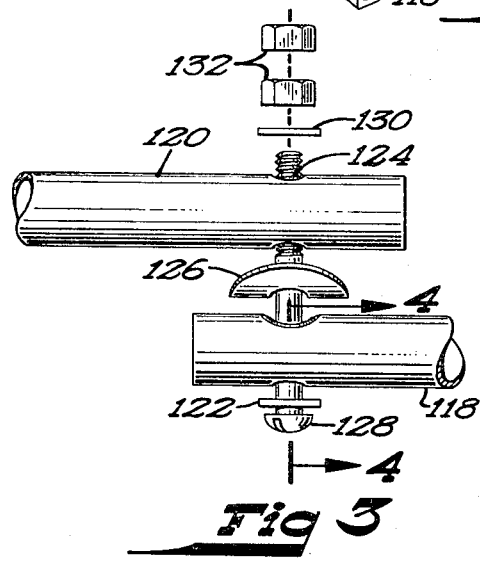
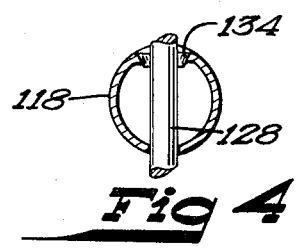
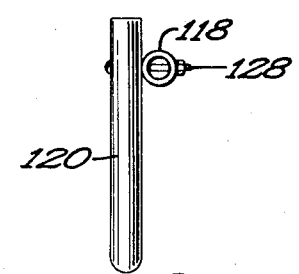
INVENTOR.
PAUL CHRISTINA
BY
ATTORNEY

CONTAINER CARRYING CARTS

SUMMARY OF THE INVENTION

This invention relates to a cart which is adapted for holding and moving containers. It is particularly adapted for holding and moving garbage cans.

There are many carts available but none exist, to my knowledge, which provide the mobility of my invention or provide the easy method of switching from a rest position to a moving position. Specifically my cart is capable of being operated from either end so that no need exists to turn it around to move it in a specific direction. Furthermore, my invention provides duplicate support stands at either end of the cart so that the operator may change from the rest position to the moving position from either end of the cart. This apparatus is called a "kick-stand" in this disclosure because it may be shifted from a retracted to a set position with the toe of the shoe. Movement of the "kick-stand" from the set position to the retracted position is accomplished by moving the cart away from the body while simultaneously pressing downward on a pushing bar or handle.

The preferred embodiment of my invention has been constructed of tubular steel except for two outside bottom rails which were constructed of angle iron. In addition I have designed my cart so that it may be packaged in eight pieces which may be easily assembled by the user.

The means for holding the stand in the support position is inventive in that the design does not require spring means to develop the force required to latch the stand in the support position. Instead the resiliency of the material from which the stand is constructed and the latching groove achieved when the stand is drilled are used to hold the stand in place. Spring means could be used, of course, if desired.

In my preferred embodiment, the size and shape of my cart was determined by the criterion that a plurality of 30 gallon garbage cans be removed easily from the cart and subsequently returned to it without careful attention to the activity.

The principal object of my invention is to provide a cart for transporting containers.

Another object of my invention is to provide a cart which can be operated easily from either the front end or the rear end.

An additional object of my invention is to provide an easily operable "kick-stand."

Another object of my invention is to provide a cart from which containers may be removed easily and into which contaimers may be placed easily.

An additional object of my invention is to provide a simple, easily constructed latch for retaining the "kick-stand" in the support position.

A final object of my invention is to provide a simple latch means for latching cylindrical members in one or more desired positions.

DESCRIPTION OF THE DRAWINGS

FIG. 1 is a perspective view or the cart.

FIG. 2a shows a side elevation of a "kick-stand" in the support position.

FIG. 2b shows a "kick-stand" in the retracted position.

FIG. 2c shows a "kick-stand" in another retracted position.

FIG. 3 is an exploded view of one form of "kick-stand" latch.

FIG. 4 is a view taken in the direction of the arrows 4 — 4 in FIG. 3.

FIG. 5 shows the addition of spring means to the latch.

FIG. 6 shows an alternate form of "kick-stand."

DESCRIPTION OF THE PREFERRED EMBODIMENT

Referring to FIG. 1, the cart is generally designated by numeral 100.

Cart 100 comprises:

A base having a pair of longitudinally arranged side rails 102, which may be made of angle iron or any other suitable material, side rails 102 being held together by a plurality of transverse members 104 which may be made of tubular steel as in the preferred embodiment, or steel rods, or any other structurally sound member; a pair of upwardly extending, generally perpendicular, transverse handle members 106, the handle members may be attached to the base by any suitable means and are constructed of U-shaped tubular steel in the preferred embodiment; struts 108, which provide additional support and further attach handles 106 to rails 102; transverse axle 112, which is attached to each side rail 102 at a point approximately equidistant from either end of the side rails 102, thereby balancing the cart on axle 112 and providing for easy movement of the cart; wheels 110, which are rotatably attached to the ends of axle 112; longitudinal members 114, which are attached to transverse members 116 to form an O-shaped retaining rail which is in turn attached to handles 106 so that the retaining rail is parallel to the base and sufficiently removed from the base to prevent containers placed thereon from easily falling therefrom ; longitudinal members 118, which extend beyond the leftmost and rightmost transverse member 104 and are rigidly attached to members 104 thereby further strengthening and becoming part of the base of the cart, the distance between members 118, which is 9 ¾ inches in the preferred embodiment, is sufficiently narrow to accomodate a 20 gallon garbage can; and U-shaped "kick-stand" members 120,which are rotatably attached to the ends of longitudinal members 118, the "kick-stands" having a support position and at least one retracted position in which the "kick-stand" has been removed from proximity with the surface upon which the cart rests so that the cart may be moved without interference from the "kick-stand." Although any suitable means for attaching the "kick-stand" to the cart may be used provided it will allow the stand to be moved easily from the support to the retracted position, the preferred means includes a simple latch means to hold the stand in the support position and takes advantage of the resiliency of members 118 and 120 to eliminate the need for spring means. This preferred means will be more fully discribed in connection with FIGS. 3, 4 and 5.

FIG. 2a shows the support position of a "kick-stand." FIG. 2b shows the usual retracted position of a "kick-stand" and FIG. 2c shows another retracted position of a "kick-stand." Positions intermediate of the retracted positions shown could be used as the retracted position if desirable.

FIG. 3 is an exploded view of the preferred means for attaching members 118 to members 120. Members 118 and stands 120 have holes 122 and 124 respectively. Hole 122 may be enlarged, if desired, to provide more positive latch or detent means to hold stand 120 in the support position. Bent washer 126 is inserted between members 118 and 120 and provides a bearing and wear surface between the two. Members 118, stands 120 and washers 126 are held together by bolt 128, washers 130 and nuts 132.

FIG. 4 is a view in the direction of arrows 4—4 and shows an additional feature which may be incorporated in my invention although not necessary for satisfactory operation. Longitudinal deformation 134 of members 118 which extends from the ends of the members to a point beyond holes 122 equal in length to the distance from holes 124 to the ends of the legs of the stands provides a positively detented retracted position. In other words the deformation must be at least long enough to allow the stands to seat therein.

FIG. 5 shows the addition of spring means 136 between washers 130 and around bolt 128. Spring means 136, in conjunction with nuts 132 provide the means for controlling the force required to shift the stand from the support to the retracted position.

FIG. 6 shows an alternate form of "kick-stand" wherein member 120 is an elongated cylinder attached to either one of members 118.

MODE OF OPERATION

Assuming both "kick-stands" are in the support position, the cart may be operated from either end by grasping one of the handles and pushing the cart forward while at the same time pushing down on the handle. The effect of the action is to cause the stand to rotate from the support position to the retracted position thereby moving out of the way and enabling the cart to be moved easily. The operator pushes the cart wherever he wishes and when he chooses to leave the cart, he moves the stand from the retracted position to the support position with his toe thereby providing a stand which maintains the cart in a position which is approximately horizontal.

I claim:
1. A cart comprising:
   a. a base;
   b. a pair of wheels rotatably mounted on the base at a point approximately midway between either end of the base so that the cart is balanced on the wheels;
   c. a pair of handles attached to either end of the base;
   d. a pair of "kick-stands" rotatably attached to either end of the base, the stands having a retracted position and a support position, the stand being in the retracted position when the extremity of the stand is distant from the surface upon which the cart rests, and being in the support position when the extremity of the stand is near the surface upon which the cart rests, the axis of rotation of the stands being transverse to the direction of motion of the cart, the radius of the arc described by the extremity of the stand as it moves from the retracted position to the support position being such that the stand will be in close proximity with the surface upon which the cart rests when the stand arrives at the support position, the stand having a circular cross section and at least one diametrical hole near one end;
   e. at least one cylindrical elongated longitudinal member attached to and extending from either end of the base, the elongated member having a hole diametrically through it near each end, wherein the hole in one of said elongated member and stand has a larger diameter than the hole in the other of said elongated member and said stand; and
   f. pin means inserted in the holes in the stands and in the elongated member for rotatably attaching the stands to the elongated member.

2. The cart of claim 1 wherein the stands have longitudinal grooves in their surface, the grooves beginning at the ends of the stand members and extending beyond the holes in the stands for a distance equal in length to the distance from one of the holes in the longitudinal member to its nearest end.

3. The apparatus of claim 1 further comprising spring means for urging the stands against the elongated member.

4. The apparatus as claimed in claim 1 wherein the hole in the stand has a larger diameter than the holes in the elongated member.

5. The apparatus of claim 4 further comprising spring means for urging the stands against the elongated member.

6. The cart of claim 1 wherein the hole in the elongated member has a larger diameter than the hole in the stand.

7. The apparatus of claim 6 further comprising spring means for urging the stands against the elongated member.

8. The cart of claim 1 wherein the elongated member has longitudinal grooves in its surface, the grooves beginning at the ends of the elongated member and having lengths at least long enough to allow the stand members to seat therein.

9. The apparatus of claim 8 further comprising spring means for urging the stands against the elongated member.

10. A cart comprising:
    a. a base which comprises a pair of longitudinally arranged side rails; and a plurality of transverse, tubular members commecting the side rails;
    b. a pair of U-shaped, generally perpendicular, transverse, tubular handles, the closed portion of the U being generally horizontal and at a height above the surface upon which the cart is resting convenient to grasping the handles with the hands, the handles being attached to the base at the ends of the legs of the U;
    c. a transverse axle attached to the base at the balance point of the cart;
    d. a pair of wheels rotatably attached to the ends of the axles;
    e. a rail attached to the handles for retaining containers placed on the cart;
    f. a pair of longitudinal tubular members which are attached to and extend beyond the base, the members having a diametrical hole near each end of the members;
    g. a pair of U-shaped stand members having diametrical holes in each leg near the end of the leg and in the plane of the U, wherein the holes in one of said longitudinal tubular members and said stand members have a larger diameter than the holes in the other of said longitudinal tubular members and said stand members, the stand having a support position and at least one retracted position in which the stand has been removed from close proximity with the surface upon which the cart is resting; and h. pin means for rotatably attaching the stands to the longitudinal members.

11. The cart of claim 10 which further comprises spring means for urging the stands against the elongated members.

* * * * *